United States Patent
Zhang

(10) Patent No.: US 11,198,559 B2
(45) Date of Patent: Dec. 14, 2021

(54) METHOD FOR MOUNTING AN INNER SUPPORT BEAM OF A CONTAINER AND THE CONTAINER

(71) Applicant: BEIJING HANDLER MULTIMODAL TRANSPORT CO., LTD., Beijing (CN)

(72) Inventor: Lizhou Zhang, Beijing (CN)

(73) Assignee: BEIJING HANDLER MULTIMODAL TRANSPORT CO., LTD., Beijing (CN)

( * ) Notice: Subject to any disclaimer, the term of this patent is extended or adjusted under 35 U.S.C. 154(b) by 0 days.

(21) Appl. No.: 16/636,640

(22) PCT Filed: Aug. 29, 2018

(86) PCT No.: PCT/CN2018/102979
§ 371 (c)(1),
(2) Date: Feb. 5, 2020

(87) PCT Pub. No.: WO2019/128279
PCT Pub. Date: Jul. 4, 2019

(65) Prior Publication Data
US 2020/0377296 A1 Dec. 3, 2020

(30) Foreign Application Priority Data

Dec. 29, 2017 (CN) .......................... 201711471715.5

(51) Int. Cl.
*B65D 90/00* (2006.01)
*B65D 90/02* (2019.01)
(Continued)

(52) U.S. Cl.
CPC ......... *B65D 90/0053* (2013.01); *B65D 85/48* (2013.01); *B65D 88/121* (2013.01); *B65D 90/027* (2013.01)

(58) Field of Classification Search
CPC .............. B65D 90/0053; B65D 90/027; B65D 90/0066; B65D 90/006; B65D 88/121
See application file for complete search history.

(56) References Cited

U.S. PATENT DOCUMENTS

| | | | | |
|---|---|---|---|---|
| 3,963,290 A | * | 6/1976 | Rennemann | B65D 88/14 312/321 |
| 5,016,764 A | * | 5/1991 | Bauer | A47B 47/04 211/189 |
| 5,671,855 A | * | 9/1997 | Norman, Jr. | B60P 1/6454 220/1.5 |

FOREIGN PATENT DOCUMENTS

| | | |
|---|---|---|
| CN | 102030165 A | 4/2011 |
| CN | 203512418 U | 4/2014 |

(Continued)

*Primary Examiner* — Anthony D Stashick
*Assistant Examiner* — Raven Collins
(74) *Attorney, Agent, or Firm* — Bayramoglu Law Offices LLC

(57) ABSTRACT

A method for mounting an inner support beam of a container, including: fixing a bottom support beam and a back support beam to a container body in a reusable and detachable manner; supporting the bottom support beam on a floor of the container body, and supporting the back support beam on a side wall corrugated plate. The back support beam is supported in a groove of the side wall corrugated plate, and the top end of the back support beam is connected to the side wall corrugated plate in the reusable and detachable manner. The end of the bottom support beam is jointed to the bottom end of the back support beam in the reusable and detachable manner and in a manner of restricting a movement of the bottom end of the back support beam in a direction away from the side wall corrugated plate.

9 Claims, 8 Drawing Sheets

(51) Int. Cl.
*B65D 85/48* (2006.01)
*B65D 88/12* (2006.01)

(56) References Cited

FOREIGN PATENT DOCUMENTS

| | | |
|---|---|---|
| CN | 205855022 U | 1/2017 |
| CN | 107235253 A | 10/2017 |
| CN | 206645341 U | 11/2017 |
| CN | 108190268 A | 6/2018 |
| CN | 208007742 U | 10/2018 |
| DE | 10047616 A1 | 5/2001 |
| EP | 0262333 A1 | 4/1988 |
| EP | 2981486 A1 | 2/2016 |

* cited by examiner

METHOD FOR MOUNTING AN INNER SUPPORT BEAM OF A CONTAINER AND THE CONTAINER

CROSS REFERENCE TO THE RELATED APPLICATIONS

This application is the national phase entry of International Application No. PCT/CN2018/102979, filed on Aug. 29, 2018, which is based upon and claims priority to Chinese Patent Application No. 201711471715.5, filed on Dec. 29, 2017, the entire contents of which are incorporated herein by reference.

TECHNICAL FIELD

The present disclosure relates to the technical field of containers. More particularly, the present disclosure relates to a method for mounting an inner support beam of a container and the container.

BACKGROUND

Currently, ISO (international Organization for Standardization) approved containers are the commonly used containers for transporting cargoes. Different cargoes require different reinforcement. As a result, according to a cargo requirement, reinforcing members for containers are mounted inside the container to ensure cargoes can be securely placed inside the container. The reinforcing members mainly include cargo shelves and wooden strips. Cargo shelves are particularly used for cargoes that are fragile and prone to be damaged (e.g. glass). The method is suitable for certain targeted and determined cargoes, which is a traditional way of the precise adaptive setting. However, different cargoes require different shelves. Moreover, shelves are difficult to mount in the container, have poor stability, and are expensive. Furthermore, transportation efficiency of the container is poor due to the size and weight of the containers with shelves. In the prior art, the wooden strips are used as a bottom support beam and a back support beam by being nailed to the floor and glued to the side wall corrugated plate. Compared to the above-mentioned shelf, the advantage of the wooden strips is that raw materials of wooden strips and steel nails are universal and do not need to be particularly customized, and the wooden strips can be fixed at an appropriate position according to the demands for different cargoes. Therefore, the wooden strips are arranged based on a traditional way of single flexible setting. In addition, the method that utilizes wooden strips is presently used for transporting glass, and the glass can be reinforced by abutting against the wooden strips without any special reinforcement structures. Compared to the cargo shelf method, the use of wooden strips is more cost effective and the load capacity of cargoes is greatly increased. However, in order to securely mount the wooden strips in the container, a large number of steel nails, having strong joint capability, are used to connect wooden strips to the floor. This process is extremely difficult and time-consuming to assemble and disassemble, and are likely to damage the floor and the wooden strips. The wooden strip is glued to the side wall corrugated plate, however a strong adhesive cannot be used to make sure the disassembling complexity is not increased. Therefore, the wooden strips glued to the side wall are extremely insecure. Furthermore, the wooden strips are disposable consumables, which are discarded after use and are not environmentally-friendly. In actual use, wooden strips are used as an inner support beam, however there is no rigid criteria for the quality of the wooden strips, and thus the quality cannot be ensured, resulting in a potential safety hazard.

Therefore, the shelves and wooden strips at present have their respective advantages and disadvantages, and the universality of different cargoes and the reuse in multiple transport operations cannot be achieved at the same time.

SUMMARY

(i) Technical Problems to be Solved

The advantages and disadvantages of the existing shelves and wooden strips are disclosed above. The universal set up for different cargoes and the reuse of the set up in multiple transportation operations cannot be achieved at the same time. In order to solve this problem, the present disclosure provides a universal method for mounting an inner support beam in a container, allowing the mounted inner support beam to be applied to different cargoes. The inner support beam can be used repeatedly in multiple transportation operations. In addition, the present disclosure further provides a container including the inner support beam.

(ii) Technical Solutions

In order to achieve the above objective, the technical solution employed by the present disclosure is as follows.

An aspect of the present disclosure provides a method for mounting an inner support beam in a container, wherein a bottom support beam and a back support beam are fixed to the container body in a reusable and detachable manner. The bottom support beam is supported on the floor of the container body, and the back support beam is supported on a side wall corrugated plate of the container body.

According to the present disclosure, the back support beam is supported in a groove on the side wall corrugated plate. The top end of the back support beam is connected to the side wall corrugated plate in a reusable and detachable manner. The end of the bottom support beam is jointed to the bottom end of the back support beam in a reusable and detachable manner and in a manner that at least restricts a movement of the bottom end of the back support beam in a direction away from the side wall corrugated plate.

According to the present disclosure, the back support beam includes a main beam facing the interior of the container body and a plurality of support members connected behind the main beam. The plurality of support members are arranged along the extending direction of the main beam. The main beam is vertically arranged or is obliquely arranged along a direction from the bottom end to the top end toward a direction close to the side wall corrugated plate. The plurality of support members are supported in the groove of the side wall corrugated plate.

According to the present disclosure, the back support beam is connected to the side wall corrugated plate by a detachable structure in a reusable and detachable manner, wherein the detachable structure includes a hook connected to the side wall corrugated plate and a hole arranged on the back support beam, and the hook passes through the hole; alternatively, the detachable structure includes a holder connected to the side wall corrugated plate and a stop member inserted in the holder. When the back support beam is assembled and disassembled, the stop member is placed in an unstopped state allowing the back support beam to move in a direction toward or away from the side wall corrugated plate. When the back support beam is supported on the side wall corrugated plate to be in an operating state, the stop member is placed in a stop state restricting the movement of the back support beam in a direction away from the side wall corrugated plate.

Another aspect of the present disclosure provides a container including a container body, wherein the container body includes a floor and a side wall corrugated plate. The container further includes a bottom support beam and a back support beam. The bottom support beam and the back support beam are fixed to the container body in a reusable and detachable manner. The bottom support beam is supported on the floor of the container body. The back support beam is supported on the side wall corrugated plate of the container body.

According to the present disclosure, the back support beam is supported in a groove of the side wall corrugated plate. The top end of the back support beam is connected to the side wall corrugated plate in a reusable and detachable manner. The end of the bottom support beam is attached to the bottom end of the back support beam in a reusable and detachable manner and in a manner that at least restricts the movement of the bottom end of the back support beam in a direction away from the side wall corrugated plate.

According to the present disclosure, the groove is provided with two blocking members which are spaced apart from one another. The two blocking members and the groove form an insertion space matched with the end of the bottom support beam. The two blocking members restrict displacement of the bottom support beam in a direction parallel to the side wall corrugated plate. The groove restricts the displacement of the bottom support beam in a direction perpendicular to the side wall corrugated plate. The bottom end of the back support beam is clamped on the end of the bottom support beam. Alternatively, the groove is provided with two blocking members which are spaced apart and an end blocking member connected between the two blocking members. The two blocking members and the end blocking member form an insertion space matched with the end of the bottom support beam, and the two blocking members restrict the displacement of the bottom support beam in a direction parallel to the side wall corrugated plate. The end blocking member restricts the displacement of the bottom support beam in a direction perpendicular to the side wall corrugated plate. The bottom end of the back support beam is clamped on the end of the bottom support beam.

According to the present disclosure, at least one end of the bottom support beam is provided with a first clamping lug group, wherein the first clamping lug group includes two first clamping lugs respectively arranged on the front side wall and the rear side wall of the bottom support beam. There is a certain distance between the first clamping lugs and an end surface of the bottom support beam. The bottom end of the back support beam is provided with two second clamping lugs that are spaced apart and extending downward. The space between the two second clamping lugs forms a clamping groove. The clamping groove is clamped on the end of the bottom support beam, and the second clamping lugs are located between the first clamping lugs and the side wall corrugated plate. The first clamping lugs restrict displacement of the second clamping lugs in an extending direction of the bottom support beam, so that the bottom support beam and the back support beam are in an interlocked state.

According to the present disclosure, the back support beam is connected to the side wall corrugated plate by a detachable structure in a reusable and detachable manner, wherein: the detachable structure includes a hook connected to the side wall corrugated plate and a hole arranged on the back support beam for inserting the hook; alternatively, the detachable structure includes a stop member movably connected to the side wall corrugated plate, wherein the stop member is capable of switching between a stop state restricting the movement of the back support beam in a direction away from the side wall corrugated plate and an unstopped state allowing the back support beam to move in a direction toward or away from the side wall corrugated plate.

According to the present disclosure, in a case where the detachable structure includes the stop member, the detachable structure further includes a holder connected to the side wall corrugated plate, and the stop member is inserted in the holder. The stop member includes a moving rod movably inserted in the holder, a high position limiting structure connected to the moving rod to limit the highest position of the stop member, and a low position limiting structure connected to the moving rod to limit the lowest position of the stop member. When the stop member is located at the lowest position, the high position limiting structure restricts the movement of the back support beam in a direction away from the side wall corrugated plate. The low position limiting structure is a threaded member screwed on the moving rod. The length of the high position limiting structure along a moving direction of the moving rod is greater than the length of the low position limiting structure along the same direction. Through holes in the holder include a first hole and a second hole connected to each other. The first hole is located above the second hole, and the diameter of the first hole is smaller than the diameter of the second hole, so as to form a limiting wall between the first hole and the second hole. When the high position limiting structure abuts against the limiting wall, the stop member is located at the highest position.

According to the present disclosure, the back support beam includes a main beam facing the interior of the container body and a plurality of support members connected behind the main beam. The plurality of support members are arranged along the extending direction of the main beam. The uppermost support member is connected to the side wall corrugated plate by the detachable structure in a reusable and detachable manner. The groove is a trapezoidal groove gradually expanding toward the interior of the container body. The width of the main beam is larger than the width of the bottom of the groove, and the width of the support member is less than or equal to the width of the bottom of the groove. The support member is supported on the bottom of the groove.

According to the present disclosure, the main beam is vertically arranged or is obliquely arranged along a direction from the bottom end to the top end toward a direction close to the side wall corrugated plate.

(iii) Advantages

The present disclosure has the following advantages.

The method for mounting an inner support beam of a container of the present disclosure is a break through considering the limits of existing two conventional setting modes (a precise adaptive setting mode of fixing shelves in the container and a single flexible setting mode of fixing wooden strips on the floor and the side wall corrugated plate) in the prior art. The bottom support beam and the back support beam of the current disclosure are fixed to the container body in a reusable and detachable manner. Therefore, the bottom support beam and the back support beam are arranged in a reusable and detachable manner, which can be applied to different cargoes and can be reused during multiple transportation operations.

The container of the present disclosure also is a break through device considering the limits of the existing two conventional setting modes (a precise adaptive setting mode of fixing shelves in the container and a single flexible setting mode of fixing wooden strips on the floor and the side wall corrugated plate) in the prior art. The bottom support beam and the back support beam of the current disclosure are fixed to the container body in a reusable and detachable manner. Therefore, the bottom support beam and the back support beam are arranged in a reusable and detachable manner, which can be applied to different cargoes and can be reused during multiple transportation operations.

Figure 1:
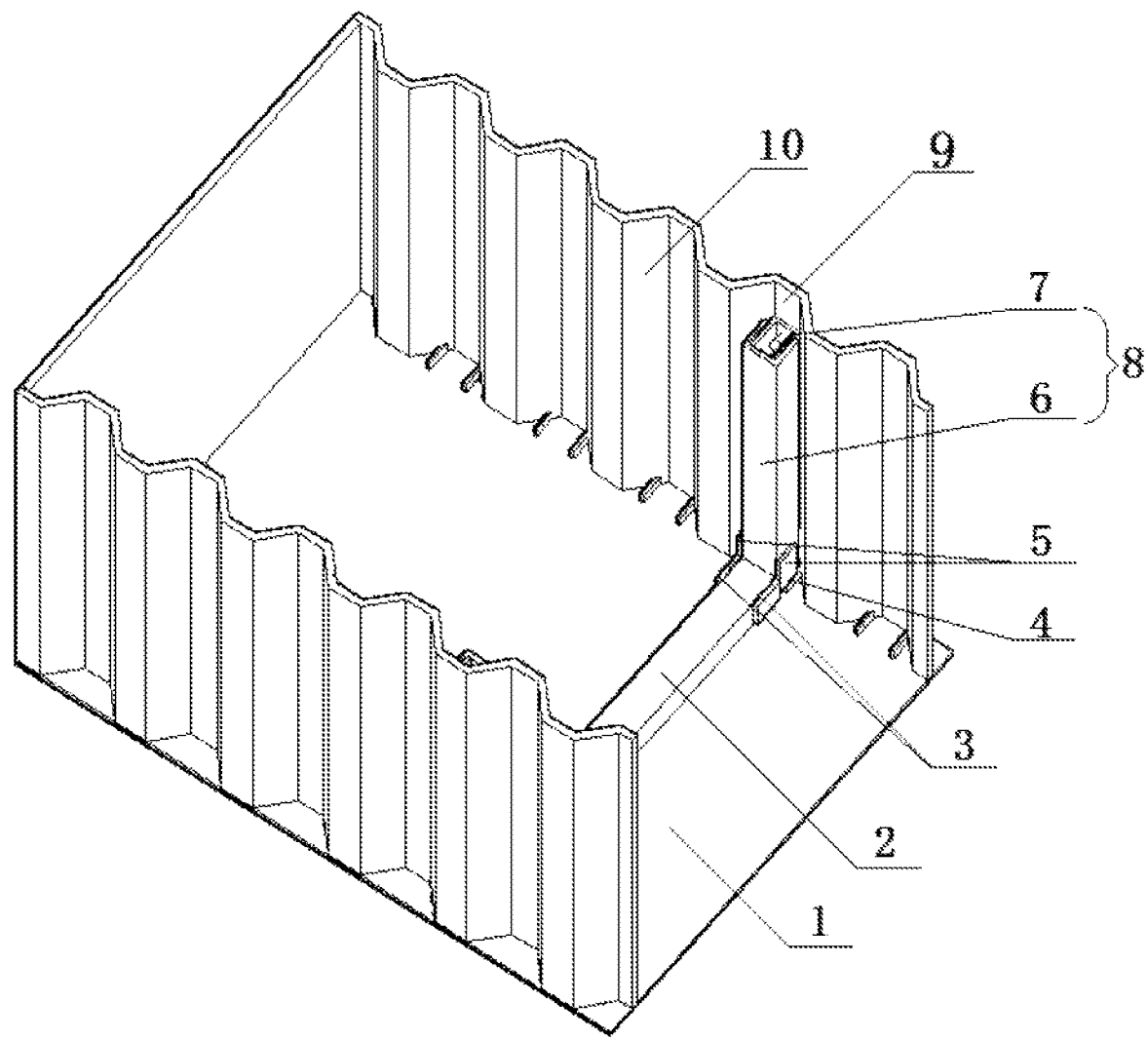
FIG. 1 is a schematic diagram showing an internal structure of a container of embodiment 1.

REFERENCE NUMERALS 1, floor; 2, bottom support beam; 3, first clamping lug; 4, blocking member; 5, second clamping lug; 6, main beam; 7, support member; 8, back support beam; 9, groove; 10, side wall corrugated plate; 11, hook; 12, hole; 13, holder; 14, low position limiting structure; 15, moving rod; 16, stop member; 17, high position limiting structure; 18, first hole; and 19, second hole.

DETAILED DESCRIPTION OF THE EMBODIMENTS

In order to better illustrate the present disclosure, the present disclosure will be expressly described hereinafter with reference to the drawings. The terminologies "top", "bottom", and other direction terminologies mentioned herein are referred to in FIGS. 1 to 8.

Embodiment 1

According to FIG. 1, the present embodiment provides a container. The container includes a container body for containing cargoes. The container body includes the floor 1, the two side wall corrugated plates 10, and the end wall connected between the two side wall corrugated plates 10. The container further includes the bottom support beam 2 and the back support beam 8. Both the bottom support beam 2 and the back support beam 8 are inner support beams of the container. The bottom support beam 2 and the back support beam 8 are fixed on the container body in a reusable and detachable manner. The bottom support beam 2 is supported on the floor 1 of the container body. The back support beam 8 is supported on the side wall corrugated plate 10 of the container body. The "in a reusable and detachable manner" wording mentioned herein indicates that the disassembly and assembly process is repeatable many times, and the disassembly and assembly process does not cause damage to the corresponding parts (such as the bottom support beam 2, the back support beam 8, and the container body).

Therefore, the container of the present embodiment is a break through compared to the limits of the two conventional setting modes (the precise adaptive setting mode of fixing shelves in the container and the single flexible setting mode of fixing wooden strips on the floor 1 and the side wall corrugated plate 10) in the prior art. The bottom support beam 2 and the back support beam 8 are arranged in a reusable and detachable manner. In this way, the container of the present embodiment allows the bottom support beam 2 and the back support beam 8 to be selectively mounted, and the set up can be applied to different cargoes, and can be reused in multiple transportation operations. The container is less likely to be damaged, thereby having a long service life, and less transportation cost.

Further, in the present embodiment, the bottom support beam 2 and the back support beam 8 are both steel parts. Compared with the existing wooden strips, the steel parts are not easy to be damaged, can provide stronger support for the cargoes, and can be reused and thus are more environment-friendly. The existing steel parts are commonly used in the field of containers. However, preferably, the bottom support beam 2 and the back support beam 8 of the present disclosure employ metal parts to ensure that the bottom support beam 2 and the back support beam 8 are not easily damaged and provide better supports for cargoes, while the metal parts are not limited to steel parts.

Figure 2:
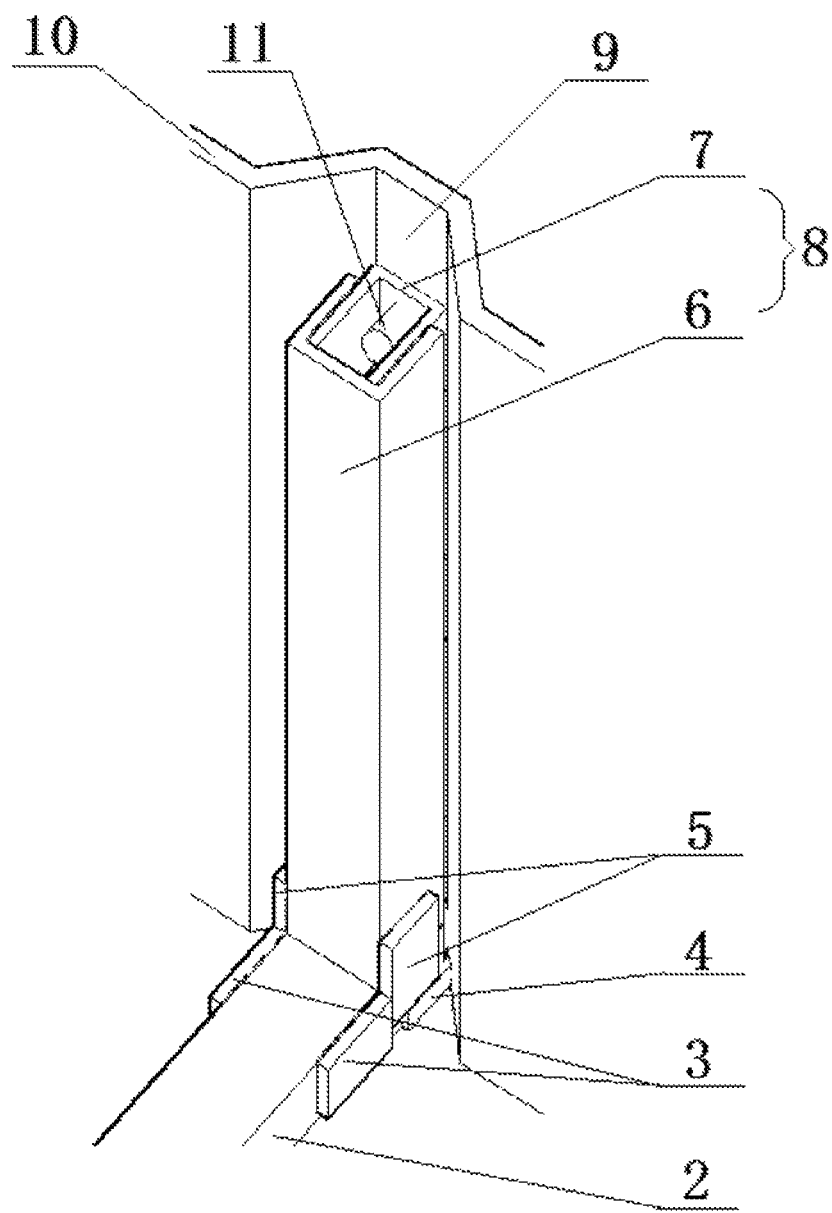
FIG. 2 is a partial view showing the structure of the container of FIG. 1.
Figure 3:
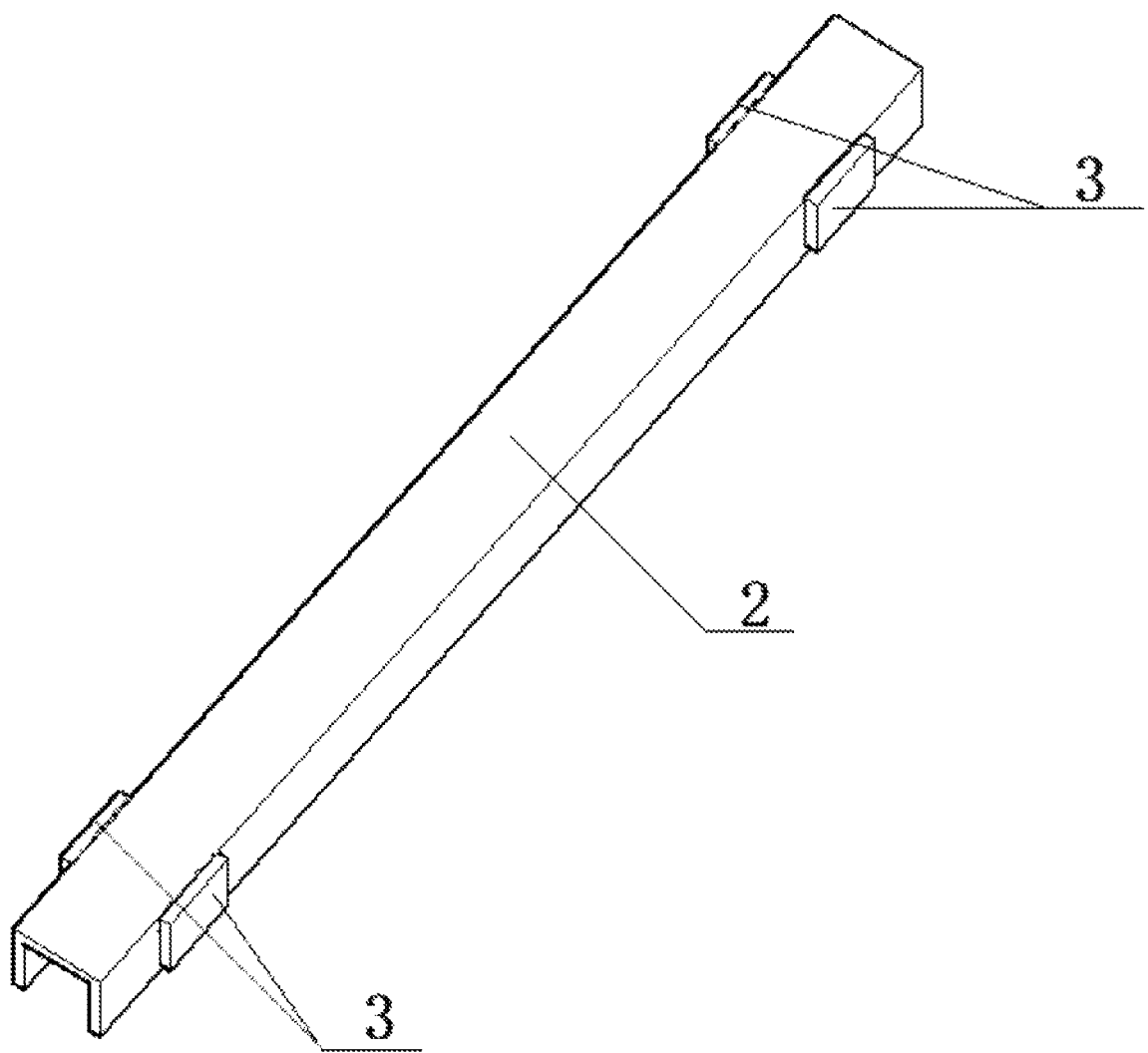
FIG. 3 is a perspective view showing a structure of a bottom support beam of the container of FIG. 1.

Further, in the present embodiment, according to FIGS. 1-3, the bottom support beam 2 is channel steel. The groove 9 of the side wall corrugated plate 10 is provided with two blocking members 4 which are spaced apart. The two blocking members 4 and the groove 9 form an insertion space matched with the end of the bottom support beam 2. The two blocking members 4 restrict the displacement of the bottom support beam 2 in a direction parallel to the side wall corrugated plate 10. The groove 9 restricts the displacement of the bottom support beam 2 in a direction perpendicular to the side wall corrugated plate 10. It should be noted that the side wall corrugated plate 10 has a corrugated structure, and the wording "parallel to the side wall corrugated plate 10" indicates that the extending direction of the wall is viewed by regarding the corrugated plate as a wall. Therefore, parallel to the side wall corrugated plate 10, i.e., parallel to the side wall of the container body. Similarly, perpendicular to the side wall corrugated plate 10, i.e., perpendicular to the side wall of the container body. In the present embodiment, the container body further includes a bottom side beam. The side wall corrugated plate 10 and the blocking member 4 are both fixed on the bottom side beam preferably by welding, so as to ensure a sufficient strength of the blocking member 4. In the present embodiment, the blocking member 4 is a baffle, or other shapes such as a blocking block.

Certainly, the present disclosure is not limited thereto. The groove 9 may be configured to directly restrict the displacement of the bottom support beam 2 in the direction parallel to the side wall corrugated plate 10 without providing the blocking member 4. However, the strength of the groove 9 is weak. Preferably, the blocking member 4 is arranged in the present embodiment in order to prevent the groove 9 from being damaged. In addition, the end blocking member can be connected between the two blocking members 4. The two blocking members 4 and the end blocking member form an insertion space matched with the end of the bottom support beam 2. The end blocking member is used to replace the groove 9 to restrict the displacement of the bottom support beam 2 in a direction perpendicular to the side wall corrugated plate 10.

In the present embodiment, two ends of the bottom support beam 2 are respectively inserted into the grooves of the two side wall corrugated plates 10 opposite to each other of the container body. Namely, the limiting modes of the two ends of the bottom support beam 2 are the same. Certainly, the present disclosure is not limited thereto. In other embodiments of the present disclosure, the limiting modes of the two ends of the bottom support beam 2 can be different.

Therefore, the movement of the bottom support beam 2 is restricted by the groove 9 and the blocking member 4 arranged in the groove 9, and the bottom support beam 2 is detachably fixed on the container body. In addition, the bottom of each groove 9 of the side wall corrugated plate 10 is provided with the blocking member 4. The bottom support beam 2 can be inserted into any groove 9 according to the need of transported cargoes. The installation structure of the bottom support beam 2 is simple, is convenient to disassemble and assemble, and has high stability. In addition, the bottom support beam 2 can be mounted at any position of the container, which is suitable for different cargoes.

Further, according to FIGS. 1-4, the back support beam 8 is supported in the groove 9 of the side wall corrugated plate 10, thereby reducing the inner space of the container body occupied by the back support beam 8, reducing the influence on the transportation capacity of the container due to the back support beam 8 arranged in the container, and improving the transportation efficiency.

Further, in the present embodiment, the top end of the back support beam 8 is connected to the side wall corrugated plate 10 in a reusable and detachable manner. The end of the bottom support beam 2 is jointed to the bottom end of the back support beam 8 in a manner that at least restricts the movement of the bottom end of the back support beam 8 in a direction away from the side wall corrugated plate 10.

Specifically, in the present embodiment, the bottom end of the back support beam 8 is fixed in the following manner.

At least one end of the bottom support beam 2 is provided with the first clamping lug group. The first clamping lug group includes two first clamping lugs 3 respectively arranged on the front side wall and the rear side wall of the bottom support beam 2. The first clamping lugs 3 have a certain distance from the end face of the bottom support beam 2. The "front" and "rear" direction indicates the direction extending along the side wall corrugated plate (i.e., toward the end door or end wall of the container).

The bottom end of the back support beam 8 is provided with two second clamping lugs 5 that are spaced apart and extending downward. The space between the two second clamping lugs 5 forms a clamping groove. The clamping groove is clamped on the end of the bottom support beam 2, and the second clamping lugs 5 are located between the first clamping lugs 3 and the side wall corrugated plate 10. The first clamping lugs 3 restrict the displacement of the second clamping lugs 5 in the extending direction of the bottom support beam 2, and the end of the bottom support beam 2 also restricts the displacement of the bottom end of the back support beam 8 in a direction perpendicular to the extending direction of the bottom support beam 2, so that the bottom support beam 2 and the back support beam 8 are in an interlocked state. Therefore, the bottom end of the back support beam 8 is clamped on the end of the bottom support beam 2 so as to fix the bottom end of the back support beam 8.

Specifically, in the present embodiment, the top end of the back support beam 8 is fixed in the following manner.

The top end of the back support beam 8 is connected to the groove 9 of the side wall corrugated plate 10 through the detachable structure in a reusable and detachable manner. The detachable structure includes the hook 11 connected to the groove 9 of the side wall corrugated plate 10 and the hole 12 arranged on the back support beam 8 for inserting the hook 11. Therefore, the top end of the back support beam 8 is fixed to the groove 9 of the side wall corrugated plate 10 in a reusable and detachable manner and in a hooking manner. In the present embodiment, the hook 11 is a pillar (or cylinder) extending perpendicular to the side wall corrugated plate 10. Certainly, the present disclosure is not limited thereto, the hook 11 can also be L-shaped, or the interior of the pillar is provided with the threaded hole 12. After the back support beam 8 is hooked on the hook 11, the outer end of the pillar is screwed with a bolt. The outer peripheral surface of the bolt head protrudes from the outer peripheral surface of the pillar, so as to block the back support beam 8.

In summary, the bottom end of the back support beam 8 is clamped on the bottom support beam 2, and the top end of the back support beam 8 is fixed on the side wall corrugated plate 10 in a reusable and detachable manner, so as to fix the back support beam 8 in the container body in a reusable and detachable manner. Furthermore, the hook 11 can be arranged in each groove 9 or a part of the grooves 9 of the side wall corrugated plate 10. The back support beam 8 can be inserted in the corresponding groove 9 according to the need of transported cargoes. In the present embodiment, the installation structure of the back support beam 8 is simple, and is convenient to disassemble and assemble. In addition, the back support beam 8 can be mounted at any position of the container, which is suitable for different cargoes.

Figure 4:
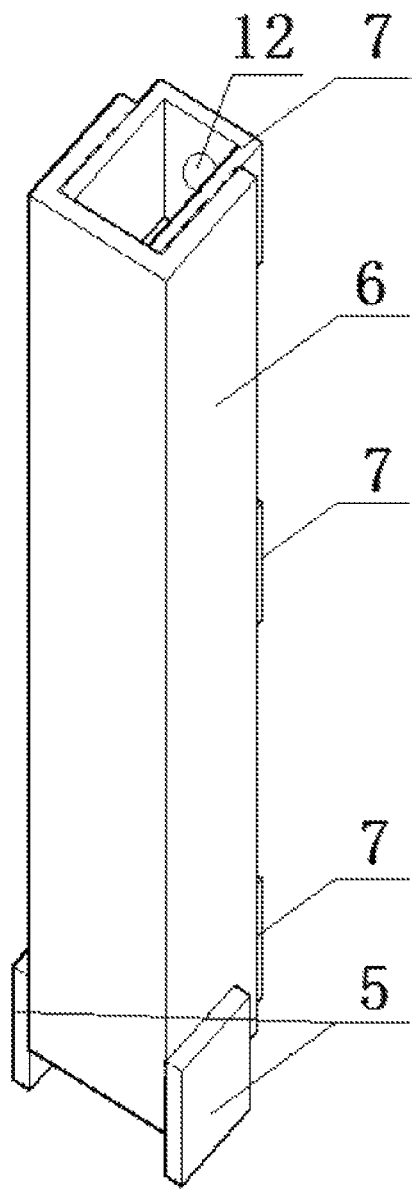
FIG. 4 is a perspective view showing a structure of a back support beam of the container of FIG. 1.

Further, according to FIG. 1 and FIG. 4, in the present embodiment, the back support beam 8 includes the main beam 6 facing the interior of the container body and the plurality of support members 7 connected behind the main beam 6. The main beam 6 is used for the cargoes to abut thereon. The plurality of support members 7 are arranged along the extending direction of the main beam 6. The uppermost support member 7 is connected to the side wall corrugated plate 10 through the detachable structure in a reusable and detachable manner. In the present embodiment, the hole 12 jointed to the hook 11 is arranged on the uppermost support member 7. In addition, the groove 9 of the side wall corrugated plate 10 in the present embodiment is a trapezoidal groove gradually expanding toward the interior of the container body. The width of the main beam 6 is larger than the width of the bottom of the groove 9 so as to provide a better support for the cargoes. The width of the support 7 is less than or equal to the width of the bottom of the groove 9, so that the support member 7 can be inserted into the groove 9 and is supported on the bottom of the groove 9. Therefore, the inner space of the container body occupied by the back support beam 8 can be reduced, and a better support can be provided for the cargoes at the same time. In addition, the plurality of support members 7 are configured to lighten the overall weight of the back support beam 8 and reduce the influence on the load capacity of the container. According to FIG. 4, the present embodiment is provided with three support members 7 which are spaced apart.

Further, in the present embodiment, the main beam 6 is channel steel. The opening of the channel steel faces the groove 9 of the side wall corrugated plate 10 adjacent to the main beam 6. The support member 7 is a U-shaped member. The opening of the support member 7 faces the opening of the channel steel and is placed in the opening of the channel steel. The support member 7 is welded to the main beam 6. Furthermore, the main beam 6 can be obliquely arranged along the direction from the bottom end to the top end toward the direction close to the side wall corrugated plate 10, so that cargoes can securely abut against the side wall corrugated plate 10, and the oblique angle is less than or equal to 3°. In such a way, plate-shaped pieces such as glass can abut against the side wall corrugated plate 10 when placed. Certainly, the present disclosure is not limited thereto, the main beam 6 can be vertically arranged. Each support member 7 is supported on the groove 9 of the side wall corrugated plate 10 regardless of whether the main beam 6 is vertically arranged or obliquely arranged.

In summary, in the present embodiment, the fixing of the bottom support beam 2 and the fixing of the back support beam 8 are matched mutually, namely, the end of the bottom support beam 2 is jointed to the bottom end of the back support beam 8 in a reusable and detachable manner, thereby simplifying the detachable structure of the bottom support beam 2 and the back support beam 8.

Certainly, the joint connection between the end of the bottom support beam 2 and the bottom end of the back support beam 8 is not limited to the above-mentioned structure. For example:

If the bottom support beam 2 is fixed by the groove 9 (or the groove 9 and the blocking member 4), the back support beam 8 can be jointed to the bottom support beam 2 in other manners other than clamping. For example, the first clamping lugs 3 are removed, and the second clamping lugs 5 of the back support beam 8 are fixedly connected to the bottom support beam 2 by bolts and other fasteners. The displacement of the bottom end of the back support beam 8 in each direction is restricted by the fixed connection with the bottom support beam. However, compared with the bolts, the above-mentioned structure in the present embodiment is more advantageous, because the threaded holes or through holes that the bolts pass through need to be aligned and then are fastened when bolts or fasteners are used. This operation needs to be performed by at least two persons, one person holds the back support beam, and one person conducts the fastening operation, resulting waste of time and manpower, and low efficiency. Also, there are many uncertain factors in the transportation process, which may lead to a bending deformation of the bolt, and thus the bolt is difficult to remove. Nevertheless, the example has drawbacks compared with the above-mentioned structure of the present embodiment, which shall still fall within the scope of protection of the present disclosure.

For example, the bottom support beam 2 can be fixed without the groove 9 (or the groove 9 and blocking member 4), and the first clamping lugs 3 and the second clamping lugs 5 are also removed. The end of the bottom support beam 2 is provided with a clamping groove which is clamped on the bottom end of the back support beam 8, or the end of the bottom support beam 2 abuts against the bottom end of the back support beam 8 in other manners. At this time, the displacement of the back support beam 8 is restricted by the groove of the corrugated plate, or other limiting members can be arranged on the side wall corrugated plate to restrict the displacement of the back support beam 8.

In conclusion, preferably, the end of the bottom support beam 2 is jointed to the bottom end of the back support beam 8 in a reusable and detachable manner and in a manner that at least restricts the movement of the bottom end of the back support beam 8 in a direction away from the side wall corrugated plate 10. Further, the end of the bottom support beam 2 is jointed to the bottom end of the back support beam 8 in a reusable and detachable manner and in a manner that restricts the movement of the bottom end of the back support beam 8 in a direction away from the side wall corrugated plate 10 and in a direction parallel to the side wall corrugated plate 10. Further, preferably, the back support beam 8 is supported on the bottom support beam 2.

Embodiment 2

The difference between embodiment 1 and the present embodiment is the fixed mode of the top end of the back support beam 8, and the present embodiment is specifically as follows.

Figure 5:
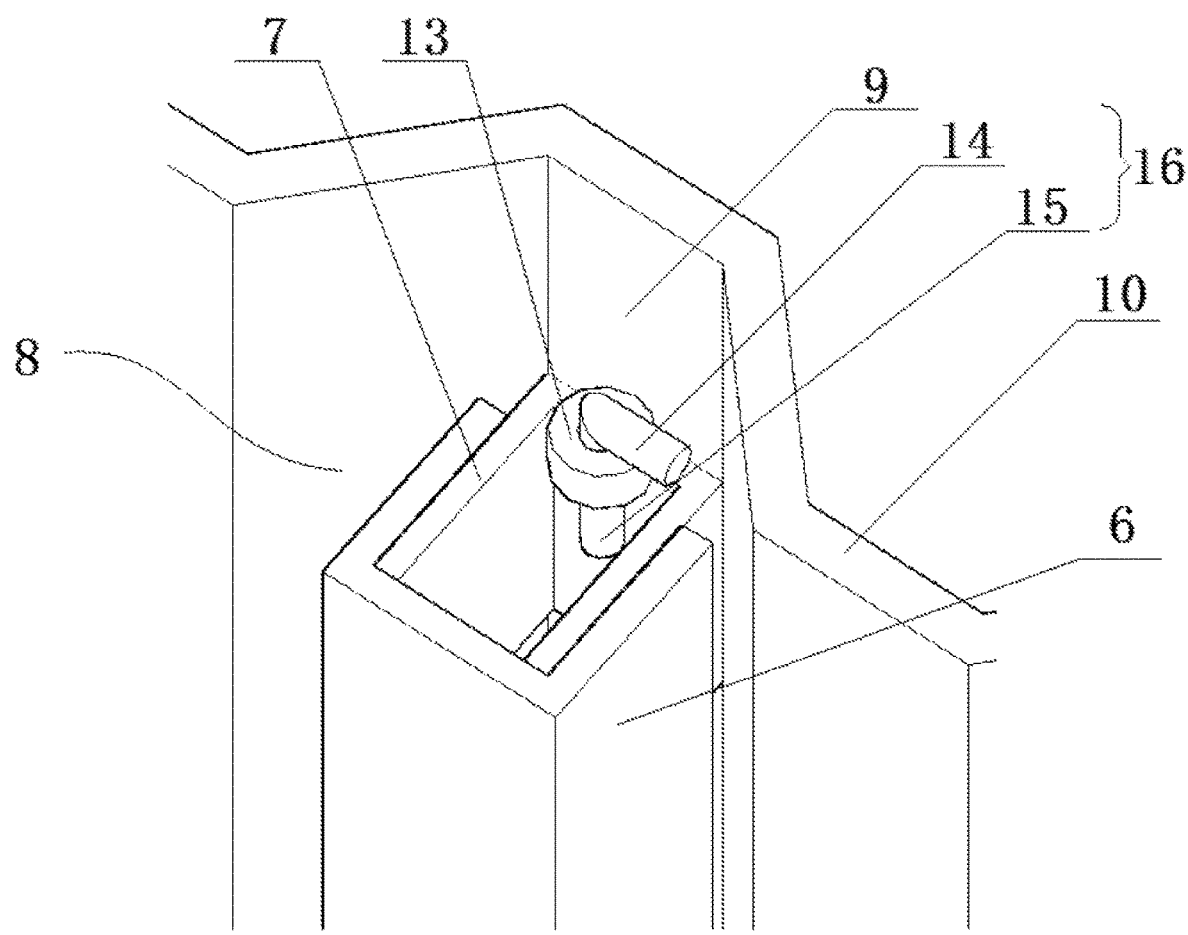
FIG. 5 is a partial view showing a structure of a container according to embodiment 2.

According to FIG. 5, in the present embodiment, the detachable structure includes the holder 13 and the stop member 16. The holder 13 is connected to the side wall corrugated plate 10 and a through hole is provided in the holder 13 in the vertical direction. The stop member 16 is inserted in the through hole of the holder 13. Specifically, the holder 13 is an annular member, preferably is a circular ring. The stop member 16 includes the moving rod 15 movably passing through the holder 13 and the low position limiting structure 14 fixedly connected to the moving rod 15 to limit the lowest position of the stop member 16. As shown in FIG. 5, for example, the stop member 16 is an inverted L-shaped rod. The vertical portion of the inverted L-shaped rod is used as the moving rod 15 mentioned above, and is inserted in the holder 13. The horizontal portion of the inverted L-shaped rod is used as the low position limiting structure 14 mentioned above. When the horizontal portion of the inverted L-shaped rod is supported on the upper surface of the holder 13, the stop member 16 is located at the lowest position. At this time, the stop member 16 is in a stop state, and the back support beam 8 is blocked by the lower portion of the moving rod 15. When the inverted L-shaped rod is pulled out from the holder 13 or is lifted up for a certain distance, the lower portion of the moving rod 15 is higher than the back support beam 8, the stop member 16 is in an unstopped state, and the back support beam 8 can be removed. Certainly, in this state, the back support beam 8 can be mounted. The gap between the moving rod 15 and the through hole 12 of the holder 13 is small. Preferably, the moving rod 15 and the through hole 12 form a clearance fit, so that the moving rod 15 does not move freely. The amount of the movement of the moving rod 15 should not be too large, so as to prevent the moving rod 15 from excessively occupying the space of the upper portion of the container body. Preferably, when the stop member 16 is located at the lowest position, the height of the portion, which blocks the back support beam 8, of the stop member 16 is less than 50 mm. Therefore, the stop member 16 is capable of switching between a stop state restricting the movement of the back support beam 8 in a direction away from the side wall corrugated plate 10 and an unstopped state allowing the back support beam 8 to move in a direction close to or away from the side wall corrugated plate 10. In the present embodiment, the back support beam 8 is connected to the side wall corrugated plate 10 in a reusable and detachable manner, which restricts the movement of the back support beam 8 in a direction perpendicular to the side wall corrugated plate 10, and prevents the back support beam 8 from overturning.

In this arrangement, the stop member 16 with the low position limiting structure 14 is convenient to mount, and can be easily removed and replaced when damaged. However, when the stop member 16 is collided or hit during the transportation process, the stop member 16 is likely to move upward and thus is separated from the holder 13, resulting a connection failure between the top end of the back support beam 8 and the side wall corrugated plate 10, and perhaps damaging the cargoes.

Embodiment 3

The difference between embodiment 2 and the present embodiment is the detachable structure, and the present embodiment is specifically as follows.

Figure 6:
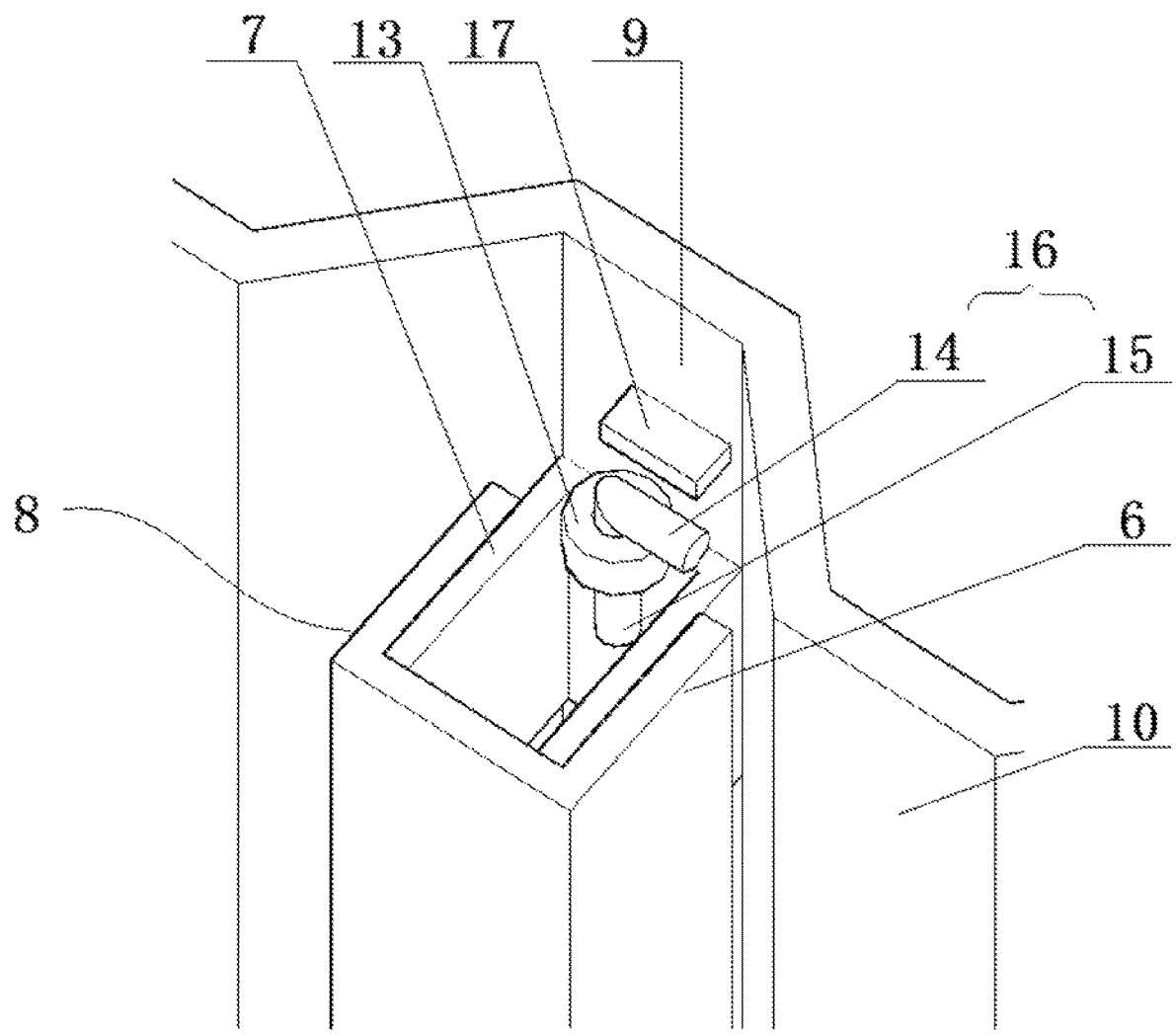
FIG. 6 is a partial view showing the structure of the container according to embodiment 3.

According to FIG. 6, based on embodiment 2, the high position limiting structure 17 for limiting the highest position of the stop member 16 is arranged on the side wall corrugated plate 10. In the present embodiment, the high position limiting structure 17 is a baffle fixed to the side wall corrugated plate 10. When the top end of the stop member 16 (i.e. the horizontal portion of the inverted L-shaped rod in the present embodiment) abuts against the high position limiting structure 17, the stop member 16 is located at the highest position, that is, in an unstopped state.

In this arrangement, the stop member 16 cannot be separated from the holder 13 during the transportation process, thereby preventing the stop member 16 from a failure and damaging the cargoes. However, the stop member 16 is difficult to be replaced when damaged.

Embodiment 4

The difference between embodiment 2 and the present embodiment is the stop member 16, and the present embodiment is specifically as follows.

Figure 7:
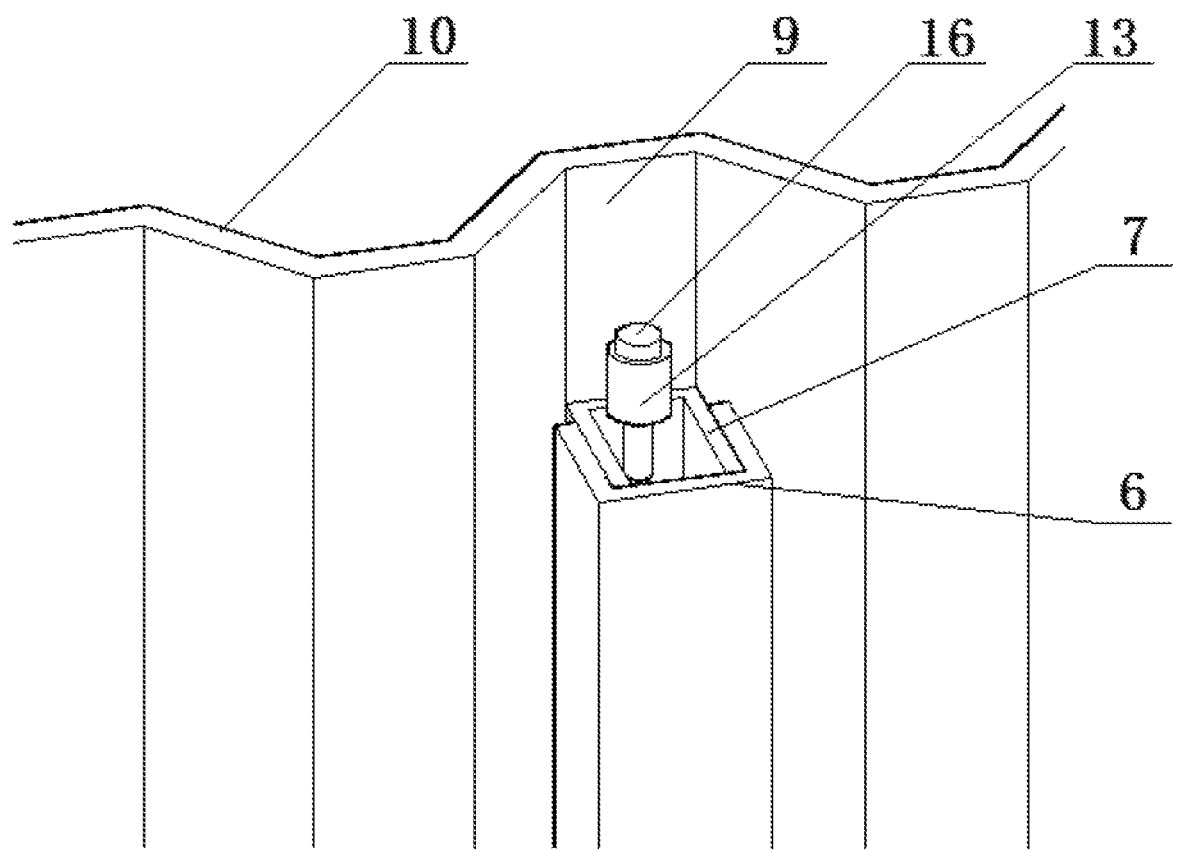
FIG. 7 is a partial view showing the structure of the container according to embodiment 4.
Figure 8:
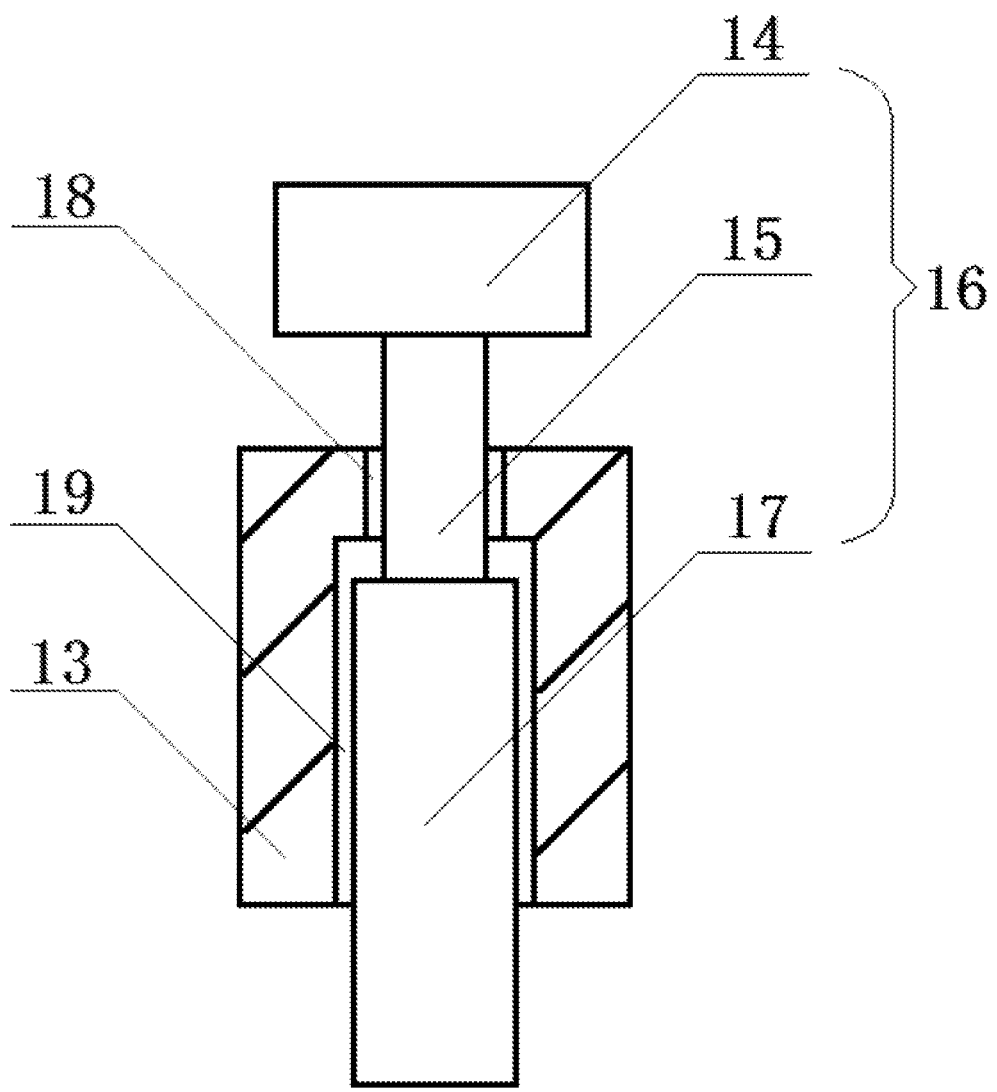
FIG. 8 is a structural schematic diagram showing a detachable structure of the container according to embodiment 4.

According to FIG. 7 and FIG. 8, in the present embodiment, the stop member 16 includes the moving rod 15, the high position limiting structure 17 fixedly connected to the moving rod 15 to limit the highest position of the stop member 16, and the low position limiting structure 14 fixedly connected to the moving rod 15 to limit the lowest position of the stop member 16. When the stop member 16 is located at the lowest position, the high position limiting structure 17 can limit the movement of the back support beam 8 in a direction away from the side wall corrugated plate 10. Specifically, the high position limiting structure 17 and the low position limiting structure 14 are cylinders fixedly connected at the upper end and the lower end of the moving rod 15. When the high position limiting structure 17 abuts against the lower surface of the holder 13, the stop member 16 is located at the highest position. When the low position limiting structure 14 abuts against the upper surface of the holder 13, the stop member 16 is located at the lowest position. In this way, the stop member 16 cannot be separated from the holder 13 during the transportation process, thereby preventing the stop member 16 from a failure and damaging the cargoes. However, the stop member 16 is difficult to be replaced when damaged.

Further, the length of the high position limiting structure 17 along the moving direction of the moving rod 15 is larger than the length of the low position limiting structure 14 along the moving direction of the moving rod 15. Therefore, the area for blocking the back support beam 8 is large, so the back support beam 8 is steadily blocked.

Further, the through holes 12 in the holder 13 include the first hole 18 and the second hole 19 connected to each other. The first hole 18 is located above the second hole 19. The diameter of the first hole 18 is smaller than the diameter of the second hole 19, so as to form a limiting wall between the first hole 18 and the second hole 19. When the high position limiting structure 17 abuts against the limiting wall, the stop member 16 is located at the highest position. Therefore, when the stop member 16 is in the stop state, the lower portion of the high position limiting structure 17 is used to block the back support beam 8, and the upper portion of the high position limiting structure 17 is located in the holder 13. When the back support beam 8 abuts against the high position limiting structure 17, the holder 13 can support the high position limiting structure 17, so the back support beam 8 is steadily blocked. Preferably, the first hole 18 forms a clearance fit with the moving rod 15, and the second hole 19 forms a clearance fit with the high position limiting structure 17, so that the back support beam 8 can be steadily blocked by the stop member 16.

Embodiment 5

The difference between embodiment 4 and the present embodiment is the structure of the stop member 16, and the present embodiment is specifically as follows.

According to FIG. 7 and FIG. 8, based on embodiment 4, the low position limiting structure 14 is a threaded member screwed on the moving rod 15 instead of a fixed connection. In this way, the stop member 16 cannot be separated from the holder 13 during the transportation process, thereby preventing the stop member 16 from a failure and damaging the cargoes. In addition, the stop member 16 can be easily replaced when damaged.

Certainly, the present disclosure is not limited thereto. In other embodiments, both the low position limiting structure 14 and the high position limiting structure 17 are threaded members screwed on the moving rod 15 at the same time; or the high position limiting structure 17 is a threaded member screwed on the moving rod 15, and the low position limiting structure 14 is fixedly connected to the moving rod 15.

Moreover, preferably, the low position limiting structure 14 is detachably connected to the moving rod 15 (by a threaded connection or other connection types). The upper position limiting structure 17 is fixedly connected to the moving rod 15, which facilitates the installation of the stop member 16.

According to embodiments 2-5, the stop member 16 switches the states by moving up and down, whereas the stop member 16 of the present disclosure is not limited thereto. In other embodiments of the present disclosure, the stop member 16 can also switch the states in a manner of rotating the stop member 16, namely, the stop member 16 is movably connected on the side wall corrugated plate and can switch between the stop state and the unstopped state.

Embodiment 6

The present embodiment provides a method for mounting an inner support beam of a container, which can be applied to embodiments 1-5 mentioned above. Specifically, the inner support beams (including the bottom support beam 2 and the back support beam 8) is fixed to the container body in a reusable and detachable manner. The bottom support beam 2 is supported on the floor 1 of the container body, and the back support beam 8 is supported on the side wall corrugated plate 10 of the container body.

The back support beam 8 is supported in the groove 9 of the side wall corrugated plate 10. The top end of the back support beam 8 is connected to the side wall corrugated plate 10 in a reusable and detachable manner. The end of the bottom support beam 2 is connected to the bottom end of the back support beam 8 in a reusable and detachable manner and in a manner that restricts the movement of the bottom end of the back support beam 8 in a direction away from the side wall corrugated plate 10. Preferably, the top end of the back support beam 8 is connected to the side wall corrugated plate 10 in a manner that at least restricts the movement of the top end of the back support beam 8 in a direction away from the side wall corrugated plate 10, and the end of the bottom support beam 2 is jointed to the bottom end of the back support beam 8 in a reusable and detachable manner and in a manner that restricts the movement of the bottom end of the back support beam 8 in a direction away from the side wall corrugated plate 10 and a direction parallel to the side wall corrugated plate 10. Further, the back support beam 8 is also supported on the bottom support beam 2.

The back support beam 8 includes the main beam 6 facing the interior of the container body and the plurality of support members 7 connected behind the main beam 6. The plurality of support members 7 are arranged along the extending direction of the main beam 6. The main beam 6 is vertically arranged or is obliquely arranged along a direction from the bottom end to the top end toward a direction close to the side wall corrugated plate 10. The plurality of support members 7 are supported in the groove 9 of the side wall corrugated plate 10, and the specific structure thereof can refer to embodiments 1-5 mentioned above.

The back support beam 8 is connected to the side wall corrugated plate 10 through the detachable structure in a reusable and detachable manner.

Specifically, the detachable structure is the same as the detachable structure of embodiment 1, including the hook 11 connected to the side wall corrugated plate 10 and the hole 12 arranged on the back support beam 8, and the hook 11 passes through the hole 12; or the detachable structure is the same as the detachable structure mentioned in embodiments 2-5, including the stop member 16 movably connected to the side wall corrugated plate 10. When the back support beam 8 is mounted or disassembled, the stop member 16 is in an unstopped state allowing the back support beam 8 to move in a direction close to or away from the side wall corrugated plate 10. When the back support beam 8 is supported on the side wall corrugated plate 10 in an operating state for the subsequent transportation, the stop member 16 is placed in a stop state that restricts the movement of the back support beam 8 in a direction away from the side wall corrugated plate 10. The specific structure can refer to embodiments 1-5.

The method for mounting the inner supporting beam of the container in the present embodiment breaks through the restricts of two conventional setting modes (a precise adaptive setting mode of fixing shelves in containers and a single flexible setting mode of fixing wooden strips on the floor 1 and the side wall corrugated plate 10) in the prior art. The bottom support beam 2 and the back support beam 8 are fixed to the container body in a reusable and detachable manner. Therefore, the bottom support beam 2 and the back support beam 8 are arranged in a reusable and detachable manner, which can be applied to different cargoes and can be reused during multiple transportation operations. Various structures that can be employed in the installation mode can refer to embodiments 1-5 mentioned above, which are not described repeatedly.

Obviously, the present disclosure is not limited to any one of the illustrative embodiments mentioned above, all the features described herein can be optionally combined into one embodiment of the present disclosure, which do not exceed the protection scope of the present disclosure.

What is claimed is:

1. A method for mounting an inner support beam of a container, comprising: fixing a bottom support beam and a back support beam to a container body in a reusable and detachable manner; supporting the bottom support beam on a floor of the container body, and supporting the back support beam on a side wall corrugated plate of the container body;

wherein the back support beam is connected to the side wall corrugated plate by a detachable structure in the reusable and detachable manner;

wherein the detachable structure comprises a hook connected to the side wall corrugated plate and a hole arranged on the back support beam, and the hook passes through the hole, or the detachable structure comprises a stop member movably connected to the side wall corrugated plate;

wherein when the back support beam is mounted or disassembled, the stop member is placed in an unstopped state allowing the back support beam to move in a direction toward or away from the side wall corrugated plate; and wherein when the back support beam is supported on the side wall corrugated plate and in an operating state, the stop member is placed in a stop state restricting a movement of the back support beam in a direction away from the side wall corrugated plate;

wherein, the back support beam is supported in a groove of the side wall corrugated plate;

a top end of the back support beam is connected to the side wall corrugated plate in the reusable and detachable manner, an end of the bottom support beam is jointed to a bottom end of the back support beam in the reusable and detachable manner and in a manner of restricting a movement of the bottom end of the back support beam in a direction away from the side wall corrugated plate;

wherein: the groove is provided with two blocking members spaced apart, the two blocking members and the groove form an insertion space matched with the end of the bottom support beam, the two blocking members restrict a displacement of the bottom support beam in a direction parallel to the side wall corrugated plate, the groove restricts a displacement of the bottom support beam in a direction perpendicular to the side wall corrugated plate, and the bottom end of the back support beam is clamped on the end of the bottom support beam, or the groove is provided with the two blocking members spaced apart and an end blocking member connected between the two blocking members, the two blocking members and the end blocking member form the insertion space matched with the end of the bottom support beam, the two blocking members restrict the displacement of the bottom support beam in the direction parallel to the side wall corrugated plate, the end blocking member restricts the displacement of the bottom support beam in the direction perpendicular to the side wall corrugated plate, and the bottom end of the back support beam is clamped on the end of the bottom support beam.

2. The method for mounting the inner support beam of the container according to claim 1, wherein, the back support beam comprises a main beam facing an interior of the container body and a plurality of support members connected behind the main beam, the plurality of support members are arranged along an extending direction of the main beam, the main beam is vertically arranged or is obliquely arranged along a direction from a bottom end of the main beam to a top end of the main beam toward a direction close to the side wall corrugated plate, the plurality of support members are supported in a groove of the side wall corrugated plate.

3. A container, comprising a container body, a bottom support beam and a back support beam, wherein, the container body comprises a floor and a side wall corrugated plate, the bottom support beam and the back support beam are fixed to the container body in a reusable and detachable manner, the bottom support beam is supported on the floor of the container body, and the back support beam is supported on the side wall corrugated plate of the container body;

wherein the back support beam is supported in a groove of the side wall corrugated plate;

a top end of the back support beam is connected to the side wall corrugated plate in the reusable and detachable manner, an end of the bottom support beam is jointed to a bottom end of the back support beam in a reusable and detachable manner, and in a manner of restricting a movement of the bottom end of the back support beam in a direction away from the side wall corrugated plate;

wherein: the groove is provided with two blocking members spaced apart, the two blocking members and the groove form an insertion space matched with the end of the bottom support beam, the two blocking members restrict a displacement of the bottom support beam in a direction parallel to the side wall corrugated plate, the groove restricts a displacement of the bottom support beam in a direction perpendicular to the side wall corrugated plate, and the bottom end of the back support beam is clamped on the end of the bottom support beam, or the groove is provided with the two blocking members spaced apart and an end blocking member connected between the two blocking members, the two blocking members and the end blocking member form the insertion space matched with the end of the bottom support beam, the two blocking members restrict the displacement of the bottom support beam in the direction parallel to the side wall corrugated plate, the end blocking member restricts the displacement of the bottom support beam in the direction perpendicular to the side wall corrugated plate, and the bottom end of the back support beam is clamped on the end of the bottom support beam.

4. The container according to claim 3, wherein, at least one end of the bottom support beam is provided with a first clamping lug group, the first clamping lug group comprises two first clamping lugs respectively arranged on a front side wall and a rear side wall of the bottom support beam, having a distance between the two first clamping lugs and an end surface of the bottom support beam; and wherein the bottom end of the back support beam is provided with two second clamping lugs spaced apart and extending downward, a space between the two second clamping lugs forms a clamping groove, the clamping groove is clamped on the end of the bottom support beam, and the two second clamping lugs are located between the two first clamping lugs and the side wall corrugated plate, the two first clamping lugs restrict a displacement of the two second clamping lugs in an extending direction of the bottom support beam, and the bottom support beam and the back support beam are in an interlocked state.

5. The container according to claim 3, wherein, the end of the bottom support beam is clamped on the bottom end of the back support beam.

6. A container, comprising a container body, a bottom support beam and a back support beam, wherein, the container body comprises a floor and a side wall corrugated plate, the bottom support beam and the back support beam are fixed to the container body in a reusable and detachable manner, the bottom support beam is supported on the floor of the container body, and the back support beam is supported on the side wall corrugated plate of the container body;

wherein the back support beam is supported in a groove of the side wall corrugated plate;

a top end of the back support beam is connected to the side wall corrugated plate in the reusable and detachable manner, an end of the bottom support beam is jointed to a bottom end of the back support beam in a reusable and detachable manner, and in a manner of restricting a movement of the bottom end of the back support beam in a direction away from the side wall corrugated plate;

wherein the back support beam is connected to the side wall corrugated plate by a detachable structure in the reusable and detachable manner, and wherein:

the detachable structure comprises a hook connected to the side wall corrugated plate and a hole arranged on the back support beam for inserting the hook, or the detachable structure comprises a stop member movably connected to the side wall corrugated plate, the stop member is configured to switch between a stop state restricting a movement of the back support beam in a direction away from the side wall corrugated plate and an unstopped state allowing the back support beam to move in a direction toward or away from the side wall corrugated plate;

when the detachable structure comprises the stop member, the detachable structure further comprises a holder connected to the side wall corrugated plate, and the stop member is inserted in the holder;

the stop member comprises a moving rod movably inserted in the holder, a high position limiting structure connected to the moving rod to limit a highest position of the stop member, and a low position limiting structure connected to the moving rod to limit a lowest position of the stop member; wherein when the stop member is located at the lowest position, the high position limiting structure restricts the movement of the back support beam in the direction away from the side wall corrugated plate; and the low position limiting structure is a threaded member screwed on the moving rod, a length of the high position limiting structure along a moving direction of the moving rod is greater than a length of the low position limiting structure along the moving direction of the moving rod; through holes in the holder comprise a first hole and a second hole, wherein the first hole and the second hole are connected to each other, the first hole is located above the second hole, a diameter of the first hole is smaller than a diameter of the second hole, a limiting wall is formed between the first hole and the second hole; wherein when the high position limiting structure abuts against the limiting wall, the stop member is located at the highest position.

7. The container according to claim 6, wherein,
the back support beam comprises a main beam facing an interior of a container body and a plurality of support members connected behind the main beam, the plurality of support members are arranged along an extending direction of the main beam, an uppermost support member of the plurality of support members is connected to the side wall corrugated plate by the detachable structure in the reusable and detachable manner;
the groove is a trapezoidal groove gradually expanding toward the interior of the container body; a width of the main beam is larger than a width of a bottom of the groove, a width of each support member is less than or equal to the width of the bottom of the groove, and each support member is supported on the bottom of the groove.

8. The container according to claim 7, wherein,
the main beam is vertically arranged or is obliquely arranged along a direction from a bottom end of the main beam to a top end of the main beam toward a direction close to the side wall corrugated plate.

9. The container according to claim 3, wherein,
at least one end of the bottom support beam is provided with a first clamping lug group, the first clamping lug group comprises two first clamping lugs respectively arranged on a front side wall and a rear side wall of the bottom support beam, having a distance between the two first clamping lugs and an end surface of the bottom support beam;
the bottom end of the back support beam is provided with two second clamping lugs spaced apart and extending downward, a space between the two second clamping lugs forms a clamping groove, the clamping groove is clamped on the end of the bottom support beam, and the two second clamping lugs are located between the two first clamping lugs and the side wall corrugated plate, the two first clamping lugs restrict a displacement of the two second clamping lugs in an extending direction of the bottom support beam, and the bottom support beam and the back support beam are in an interlocked state.

\* \* \* \* \*